(12) United States Patent
Storti (10) Patent No.: US 9,758,211 B2
(45) Date of Patent: Sep. 12, 2017

(54) TRANSMISSION FOR MEANS OF TRANSPORT WITH TORQUE MEASUREMENT

(71) Applicant: SIRAL S.R.L., Recoaro Terme (Vicenza) (IT)

(72) Inventor: Fabrizio Storti, Recoaro Terme (IT)

(73) Assignee: SIRAL S.R.L., Recoaro Terme (IT)

( * ) Notice: Subject to any disclaimer, the term of this patent is extended or adjusted under 35 U.S.C. 154(b) by 226 days.

(21) Appl. No.: 14/735,737

(22) Filed: Jun. 10, 2015

(65) Prior Publication Data

US 2016/0362158 A1 Dec. 15, 2016

(51) Int. Cl.
| | |
|---|---|
| *G01L 1/22* | (2006.01) |
| *B62M 6/50* | (2010.01) |
| *B62M 9/06* | (2006.01) |
| *B62M 11/06* | (2006.01) |
| *G01L 3/10* | (2006.01) |

(52) U.S. Cl.
CPC ............... *B62M 6/50* (2013.01); *B62M 9/06* (2013.01); *B62M 11/06* (2013.01); *G01L 3/108* (2013.01)

(58) Field of Classification Search
CPC .......... B62M 6/50; B62M 9/06; B62M 11/06; F16H 48/06; G01L 3/108
USPC ...................................................... 73/862.045
See application file for complete search history.

(56) References Cited

U.S. PATENT DOCUMENTS

| | | | | |
|---|---|---|---|---|
| 3,832,897 | A | | 9/1974 | Schenck |
| 4,188,821 | A | * | 2/1980 | Elias ..................... G01L 3/1471 73/862.31 |
| 5,514,044 | A | * | 5/1996 | Antonov ................. F16D 13/74 475/257 |
| 8,650,972 | B2 | * | 2/2014 | Kitamura .............. B60B 27/023 73/862.49 |
| 8,677,837 | B2 | * | 3/2014 | Mercat ..................... B62M 6/50 73/862.325 |

(Continued)

FOREIGN PATENT DOCUMENTS

| | | |
|---|---|---|
| DE | 103 39 304 A1 | 5/2005 |
| DE | 10 2010 001775 A1 | 8/2011 |

(Continued)

*Primary Examiner* — Lisa Caputo
*Assistant Examiner* — Octavia Hollington
(74) *Attorney, Agent, or Firm* — Pearne & Gordon LLP (57) ABSTRACT

Described is a transmission 1 for means of transport comprising: a driving shaft 10 suitable for being positioned on the axis ("X") of a pedals and wheel assembly 100, an intermediate shaft 20 comprising a plurality of first transmission units 200 rotated by a gear wheel 12 fixed on the driving shaft 10, a user shaft 30 comprising a respective plurality of second transmission units 300 and at least one output 32 of the transmission 1, wherein each second transmission unit 300 rotated by a respective first transmission unit 200. The transmission 1 also comprises a rigid supporting element 60 structured for forming at least one fixed support for at least the intermediate shaft 20 and a measuring element 70 comprising a first portion 71 with controlled deformation forming at least one mobile support for the intermediate shaft 20 wherein the intermediate shaft 20 can rotate relative to the mobile support 71 and a second supporting portion 72 interposed between the first portion 71 and the rigid supporting element 60.

13 Claims, 6 Drawing Sheets

(56) References Cited

U.S. PATENT DOCUMENTS

| | | | |
|---|---|---|---|
| 9,302,734 B2 * | 4/2016 | Getta | B62M 6/55 |
| 2012/0204658 A1 | 8/2012 | Mercat et al. | |
| 2012/0285264 A1 | 11/2012 | Sasaki | |
| 2015/0360750 A1 * | 12/2015 | Luk | B62M 11/14 |
| | | | 475/149 |

FOREIGN PATENT DOCUMENTS

| WO | 03/104672 A1 | 12/2003 |
|---|---|---|
| WO | 2005/021368 A1 | 3/2005 |

* cited by examiner

TRANSMISSION FOR MEANS OF TRANSPORT WITH TORQUE MEASUREMENT

FIELD OF THE INVENTION

This invention relates to a transmission for means of transport. Preferably, this invention is applied on bicycles and, therefore, it will be referred to below mainly as a transmission for bicycles. In any case, it should be noted that this transmission could be applied on any means of transport such as, for example, motorised vehicles or non-motorised vehicles.

More specifically, this invention relates to a transmission for bicycles with an element for measuring the drive torque transmitted by a pedals and wheel assembly of a bicycle to a crown of the drive wheel.

DESCRIPTION OF RELATED ART

In the prior art, bicycles are usually equipped with a transmission which is able to change the transmission ratio to allow a more practical use of the means of transport on any type of path, both in town and country. It is known that the transmission for bicycles allows the transmission ratio to be changed in order to facilitate a user during the ride. In other words, changing the transmission ratio allows use of the bicycle over the widest range of speed possible.

It is known that changing the transmission ratio results in a change of the drive torque and speed of rotation between an inlet and an outlet of the transmission: the greater the number of ratios which can be inserted the greater will be the range of speeds which can be achieved It is evident that for a bicycle user, the range of values within which the drive torque to be provided to the means of transport during use is also quite large, often passing from a step for recovering the force by idle pedaling to a very challenging pedaling and vice versa.

In the prior art, there are bicycles equipped with an electric motor with the purpose of assisting the user during the ride.

Generally speaking, the technology of the electric bicycle comprises an electric motor, a rechargeable battery and an electronic control system, by which the user can select the degree of assistance to the pedaling: the electric motor thus provides a constant torque based on the degree of assistance selected by the user and which will be independent of the force which the user effectively exerts during the ride.

According to the prior art, there are bicycles equipped with a more advanced electronic control system comprising an apparatus for measuring the drive torque applied between an inlet and an outlet of the bicycle transmission.

Measuring and monitoring the value of the drive torque transmitted generally makes it possible to optimise the action of the electric motor during the ride. In effect, the electronic control system fitted to electric bicycles processes the information received from the apparatus which measures the drive torque and activates/deactivates or chokes the work of the electric motor according to requirements.

In other words, a user carrying out "power" pedaling (high drive torque value and generally slow angular speed) will benefit from the action of the electric motor which partly replaces the user, thus reducing his/her physical effort; as soon as the load on the pedaling is reduced, the apparatus which measures the new value of the drive torque sends the information to the control system which will also reduce the torque delivered by the electric motor. At the same time as the action of the electric motor on the transmission of the bicycle, the user must control the transmission ratio acting on the transmission.

In the prior art, the apparatus which measures the value of the drive torque comprises a drive torque sensor generally installed on the central movement of the bicycle, that is to say, on the axis of the pedal cranks.

More in detail, the torque sensor may comprise two flanges associated with one another in that they are two ends of a single electronic device, which are mounted coaxially on the central movement axis of the bicycle: one is mounted at the hub and the other on the gear wheel. Generally speaking, the flange of the gear wheel and the gear wheel itself are made as one piece or are connected often in a permanent fashion so that the set of two parts is rigid in such a way as to not alter any reading of the data relating to the drive torque transmitted.

The flange mounted on the hub of the central movement is connected on it by known methods in the mechanical sector or it may be made as one piece together with the central movement shaft.

The two flanges facing each other, according to one of different physical principles, are able to transduce every minimum torsional sliding which occurs between them during the use of the bicycle into an electrical signal directed to the electronic control system which in turn process it to control the work of the electric motor.

According to the prior art, the drive torque sensors for a bicycle transmission as described above have some drawbacks which limit the use in terms of effectiveness, safety and costs.

The torque sensor as described above often requires high costs and lengthy production times, shifting the final cost of the electric bicycle away a predetermined type of market.

Moreover, the torque sensor designed in this way is quite complex in terms of assembly, setting (calibration) and maintenance during the life of the transmission.

More in detail, the flange and the gear wheel could be quite bulky and heavy when made according to the traditional mechanical processing techniques.

The consequent choice to miniaturise the mechanical parts as mentioned above can only be achieved with the use of special materials (lightweight, high strength alloys) and with mechanical processing performed with suitable machine tools. Consequently the production costs would increase considerably compared with the prior art.

Sometimes, this type of torque sensor is not free of operating faults and/or failures: in effect, the mechanical and electrical system of the sensor comprises mechanical and electronic elements applied at a rather delicate point of the transmission for electric bicycles, that is, the central movement, which is typically subject to slow rotational speeds and high drive torque values as well as shaking and vibrations due to the route ridden with the bicycle.

Another known drawback is that a solution of this kind comprises making mechanical parts based on a specific design and with machining not provided for a traditional transmission of an electric bicycle without the torque sensor.

This means that the interchangeability and the compatibility of the mechanical parts of the torque sensor are not possible with the known mechanical parts in the transmission for bicycles.

SUMMARY OF THE INVENTION

In this context, the technical purpose of this invention is to provide a transmission for means of transport to overcome the above mentioned drawbacks.

More specifically, the aim of this invention is to provide a transmission for means of transport which allows the user to use the means of transport in an optimum and comfortable fashion.

It is also aim of this invention is to provide a transmission for means of transport which allows a simple and efficient use of the transmission in terms of energy expended to cover a particular journey and in terms of changing the transmission ratio during use of the means of transport.

Moreover, another aim of this invention is to provide a bicycle comprising a transmission equipped for measuring the drive torque which is both simple to make and which can be installed, if necessary, also on bicycles with transmission without this sensor.

These and other aims are substantially achieved by a transmission for means of transport as described in one or more of the appended claims.

The dependent claims correspond to possible embodiments of the invention.

Further features and advantages of the present invention are more apparent from the detailed description of a preferred, but non-exclusive, embodiment of a transmission for means of transport according to this invention.

BRIEF DESCRIPTION OF THE DRAWINGS

The description is provided below with reference to the accompanying drawings, which are also non-limiting and provided by way of example only, in which.

DETAILED DESCRIPTION OF PREFERRED EMBODIMENTS OF THE INVENTION

The accompanying drawings show in its entirety a transmission for bicycles in more than one embodiment according to the inventive concept of this invention.

The transmission for means of transport, which will hereafter be referred to as "transmission", is labelled in its entirety in the accompanying drawings with the numeral 1.

It should be noted that the concepts of driving torque or driving force are mechanical concepts linked to each other by a geometrical entity the "arm"; consequently, in this description both the concepts will be considered alternatively and both the terminologies will adapted according to the particular needs of clarity.

According to the preferred embodiment of this invention, illustrated in the accompanying drawings, the transmission 1 comprises a driving shaft 10, an intermediate shaft 20 and a user shaft 30.

The driving shaft 10 has at least one free end 11 designed to act as input for moving the driving shaft 10 by a pair of external forces, that is, forces transmitted/active between/ from elements which may not be directly included in the transmission 1.

Figure 1:
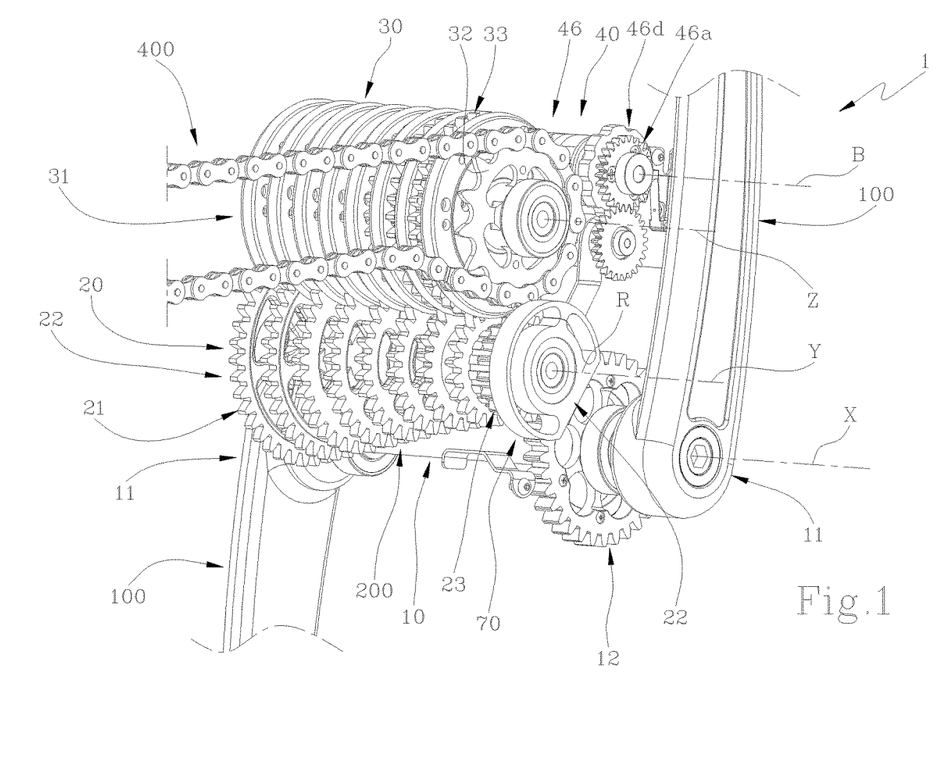
FIG. 1 is a schematic perspective view of the transmission in an embodiment according to this invention.

For example, the driving shaft 10 may have two free ends 11 equipped as inlet for a mechanical force/torque to which bicycle pedal cranks 100 may be fixed (see FIG. 1).

With reference again to the preferred embodiment of the invention, the driving shaft 10 comprises a pinion 12, that is, a gear wheel, keyed onto the driving shaft 10. The pinion 12 is rigidly connected to the driving shaft 10 in such a way that they transmit a pair of forces between shaft 10 and pinion 12 during the operation of the transmission 1.

The driving shaft 10 rotates about its own axis of rotation "X".

The intermediate shaft 20 of the transmission 1 has a relative axis of rotation "Y" positioned parallel to the axis of rotation "X" of the driving shaft 10. In the example illustrated in FIG. 1 the axis of rotation Y is spaced from the axis of rotation X.

Preferably, the intermediate shaft 20 comprises a plurality of first transmission units 200, in particular a series of gear wheels 21 arranged in an ordered or mixed sequence along the axis "Y" of the intermediate shaft 20.

Preferably, according to a possible embodiment for example illustrated in the accompanying drawings, the gear wheels 21 are keyed on the intermediate shaft 20 in such a way as to be constantly rotatable in an integral fashion with the intermediate shaft 20.

More specifically, the sequence of the gear wheels 21 may be ordered along the axis Y in an increasing or decreasing fashion or mixed in terms of dimensions and/or number of teeth of each gear wheel 21.

Preferably, the intermediate shaft 20 at one end 22 comprises a pinion 23 keyed on the shaft 20 and having dimensional and mechanical features which can be different from the plurality of gear wheels 21 adjacent to it. According to one embodiment for example illustrated in particular in FIGS. 1-1A, the sequence of the gear wheels 21 may be ordered along the axis Y in an increasing or decreasing fashion or mixed in terms of dimensions and/or number of teeth of each gear wheel 21 starting from the pinion 23.

More specifically, the pinion 23 of the intermediate shaft 20 is suitable for meshing, with the pinion 12 of the driving shaft 10.

In other words, the gear wheels 21 positioned along the axis Y may have dimensions (in particular the diameter) which are different from each other regardless of the consequential order in which they are positioned.

The meshing of the pinion 12 of the driving shaft 10 with the pinion 23 of the intermediate shaft 20 makes it possible to drive the movement of the intermediate shaft 20, when the driving shaft 10 is driven by, for example, external forces acting on the bicycle pedal cranks 100 (for example the force exerted by the user on the pedal cranks 100).

According to this embodiment, the user shaft 30 has a relative axis of rotation "Z". Preferably, the axis "Z" is positioned parallel to the axis of rotation "Y" of the intermediate shaft 20. In the embodiment illustrated, the user shaft 30 is parallel also to the driving axis 10. In the example illustrated in FIG. 1 the axis of rotation Z is spaced from the axis of rotation X and from the axis of rotation Y.

In an alternative embodiment not illustrated in the accompanying drawings, the axis of rotation "Z" of the user shaft 30 might not be parallel with respect to the axis of rotation "X" of the driving shaft 10 and with respect to the axis of rotation "Y" of the intermediate shaft 20. More specifically, the axis of rotation "Z" of the user shaft 30 could be mounted transversely or perpendicularly to the axis of rotation "X" of the driving shaft 10 and/or relative to the axis of rotation "Y" of the intermediate shaft 20 and coupled to the latter by suitable pairs of gears (for example conical pairs).

Preferably, the user shaft 30 has on a relative end 31 an output pinion 32 from the transmission 1, as illustrated in FIG. 1.

Preferably, the output pinion 32 may be a gear wheel designed to mesh with a transmission chain 400, in particular a bicycle chain 400 directly to the drive wheel of the bicycle, as shown in FIG. 1A.

The user shaft 30 comprises a plurality of second transmission units 300, in particular a series of gear wheels 33 arranged in an ordered sequence along the axis "Z" of the shaft 30.

Preferably, the number of gear wheels 33 of the set of the user shaft 30 is equal to the number of gear wheels 21 of the set of the intermediate shaft 20.

Each gear wheel 30 of the user shaft 33 is positioned axially at a respective gear wheel 21 of the intermediate shaft 20 in such a way that meshing with each other they can establish a predetermined transmission ratio between the intermediate shaft 20 and the user shaft 30. The ratio is selectively inserted each time in an operating configuration of the transmission 1.

With reference to FIG. 1, preferably each gear wheel 30 of the user shaft 33 can rotate freely relative to the user shaft in a non-selected configuration of the gear wheel 33.

Moreover, during an operating configuration of the transmission 1, the intermediate shaft 20 and all the respective gear wheels 21 are rotatable in an integral fashion with each other, whilst only a gear wheel 33 of the user shaft 30 is rotated by the respective gear wheel 21 of the intermediate shaft 20 and, simultaneously, is rotatably integral with the respective user shaft 30.

Preferably, so that a single and predetermined transmission ratio is established between the secondary shaft 20 and the user shaft 30 the mechanical transmission performed by each pair of gear wheels 21, 33 can be inserted selectively so as to establish a reversible connection, rotatably integral with the respective shaft 20, 30.

The transmission 1 comprises an activation system 40 designed in such a way as to define a configuration of the transmission 1 wherein the activation system 40 forms a reversible engagement of an above-mentioned mechanical transmission, establishing a connection between the driving shaft 10 and the user shaft 30, and a configuration of the transmission 1 wherein the activation system 40 forms a reversible disengagement of the mechanical transmission, interrupting a connection between the driving shaft 10 and the user shaft 30.

More specifically, the activation system 40 in the configuration of transmission 1 engaged is such as to selectively rotate in an integral fashion a first transmission unit 200 of the intermediate shaft 20 with a respective second transmission unit selected from the second transmission units 300 of the user shaft 30 to establish a predetermined transmission ratio between inlet 11 and outlet 32 from the transmission 1.

Vice versa, the activation system 40 in the configuration of transmission 1 disengaged is such as to disengage the rotation in an integral fashion between a first transmission unit 200 of the intermediate shaft 20 with a respective second transmission unit selected from the second transmission units 300 of the user shaft 30 interrupting the connection between driving shaft 10 and user shaft 30.

Preferably, the activation system 40 comprises a structural part applied between the intermediate shaft 20 and the user shaft 30 and a unit for controlling the movement of the gear.

The activation means 40 may comprise a coupling system with reversible connection, based on which a predetermined external force (defining a difference in speed between a disc 45, operatively connected to the gear wheel, and the gear wheel itself) operating between shaft and respective gear wheel, engages a pick up element in a seat designed to allow rigid connection of the gear wheel to the shaft.

For example, a coupling system with reversible connection similar to that described above is shown and described in patent document WO 03/104672 which is incorporated herein by reference in the part which describes the structure and operation.

Figure 2:
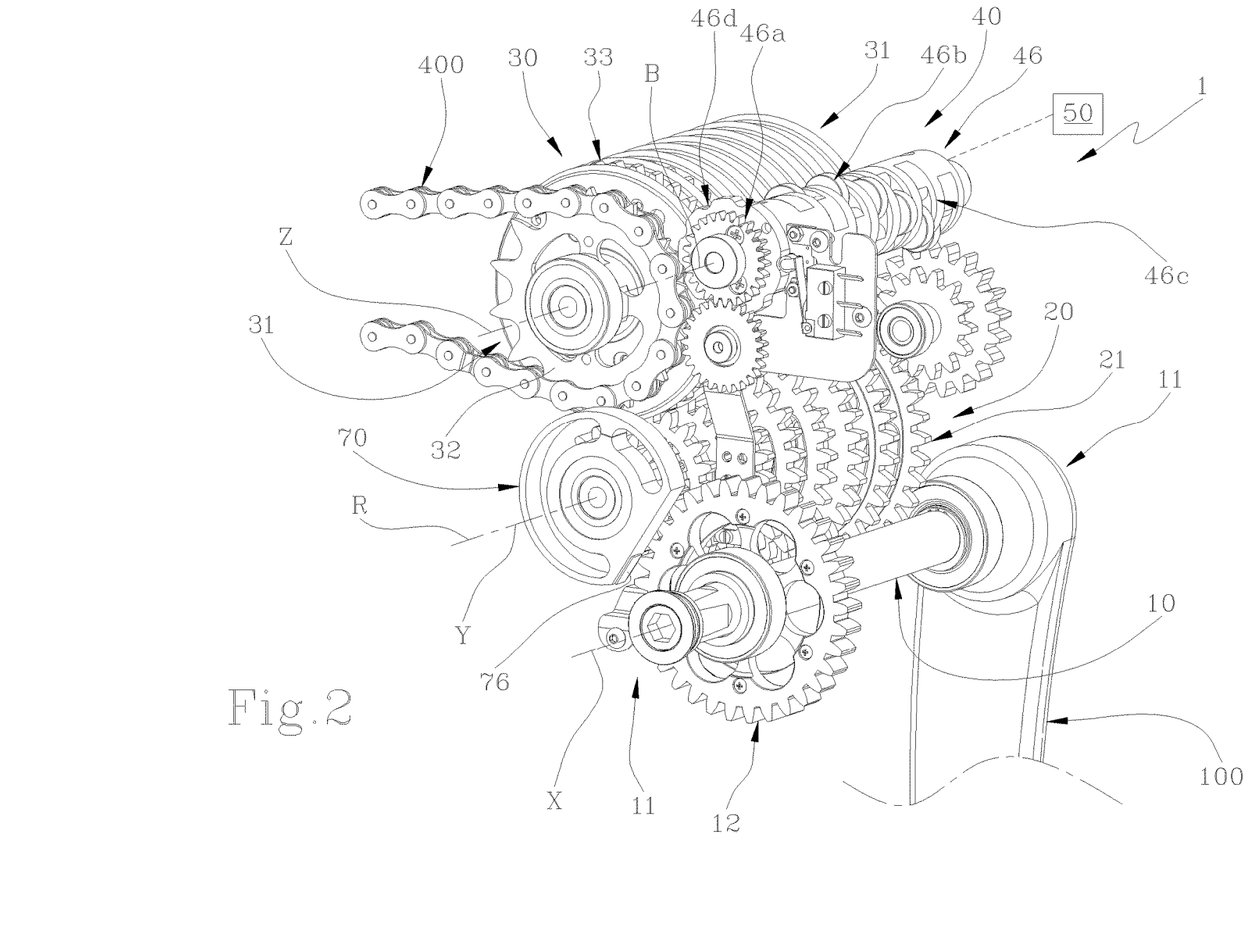
FIG. 2 is a schematic perspective view of the transmission of FIG. 1 with some parts not illustrated to better illustrate others.
Figure 6:
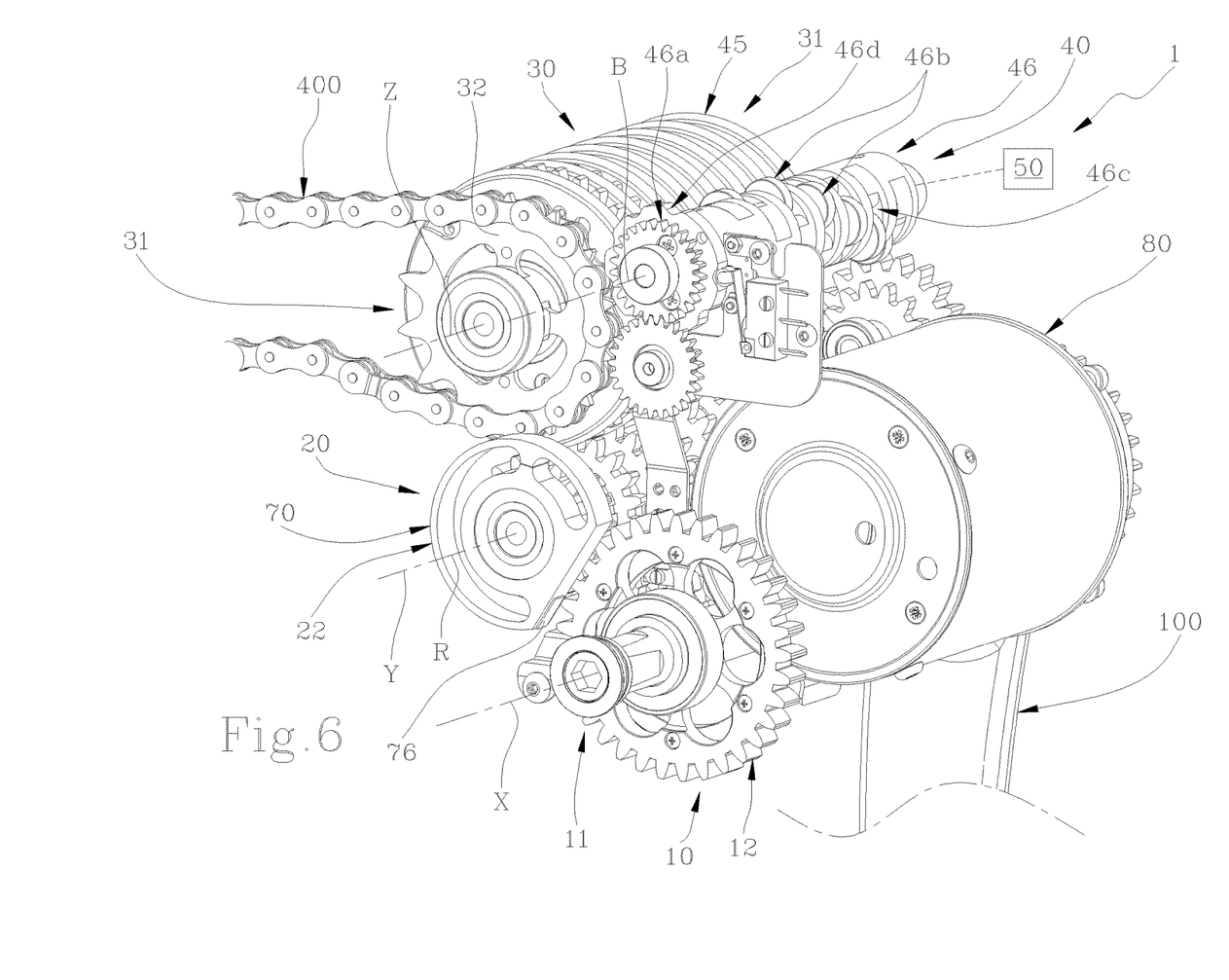
FIG. 6 is schematic perspective view of a different embodiment of the transmission according to this invention.

A preferred embodiment of the invention wherein the activation system 40 acts on the user shaft 30 is illustrated for example in FIGS. 1, 2 and 6.

The pick up elements are connected respectively to each gear wheel 33 of the user shaft 30. The user shaft 30 has at each gear wheel 33 a seat shaped in such a way as to receive at least one portion of the pick up element when there is an engaged configuration of the pick up element on the user shaft 30. At least one elastic element controls the movement of the pick up element to and from the respective shaped seat of the user shaft 30.

Preferably, the activation system 40 also comprises a slowing disk 45 operatively connected to a respective gear wheel 33 of the user shaft 30. Each slowing disk 45 is rotatably mobile relative to the respective gear wheel 33 about the user shaft 30 between a first position and a second position.

More specifically, each slowing disk 45 is configured in such a way as to selectively rotate in an integral fashion the respective gear wheel 33 with the user shaft 30 by generating a transient difference in speed of rotation between the selected gear wheel 33 and the respective slowing disk 45 in such a way as to move the latter from the first position to the second position. Preferably, the elastic element is designed to keep the slowing disk 45 in the first position.

In other words, each gear wheel 30 of the user shaft 33 is associated with a respective slowing disk 45 preferably fixed to the respective gear wheel 33 by screws and/or centring pins or similar systems.

The activation system 40 also comprise a drum 46 rotating about an axis "B", preferably parallel to the axis of rotation "Z" of the user shaft sector 30. Preferably, the drum 46 is cylindrical in shape and extends along the relative axis of rotation "B" at least for a length equal to the length of the set of gear wheels 33 positioned on the user shaft 30.

With reference to FIGS. 1-2 and 6, the drum 46 has at a relative end a movement element 46a fixed to the drum and designed to rotate the drum 46 about its axis "B".

Preferably, the drum 46 comprises on its outside surface a plurality of rotary elements 46b such that they interact with respective slowing disks 45 present on the user shaft 30 for generating a friction force, still more preferably a sliding type friction force. The rotary elements 46b comprise contact members housed in slots 46c distributed along the outer surface of the drum 46 according to a predetermined order.

Preferably, the slots 46c of the contact members are made by machining a solid piece of material and then fixed on the drum 46 by means of threaded fixing systems or made on the drum 46 by direct mechanical processing.

The contact members 46c are cylindrical and rotatably connected to the drum 46 in such a way as to rotate about a respective axis of rotation parallel to the axis of rotation "Z"

of the user shaft 30 and, therefore, also to the axis "B" of the drum 46, according to this embodiment.

The contact members protrude from the outer surface of the rotary drum 46 by a distance as a percentage of its diameter.

In a different embodiment of the drum 46, not illustrated and fully covered in the inventive concept of this invention, the contact members may be integral with the cylindrical body of the drum or made in one piece with the drum.

Preferably, the contact members are angularly divided symmetrically about the axis of rotation "B" of the drum 46. Still more preferably, the contact members are spaced along the axis of rotation "B" according a distance equal to the distance of the gear wheels 33 present on the user shaft 30.

In other words, the contact members 46c of the drum 46 are housed on it in such a way as to be positioned at the gear wheels 33.

More specifically, each contact member of the drum 46 is positioned at a respective slowing disk 45 and friction elements.

Each contact member is positioned along a spiral trajectory such as to wrap around at least partly the outer surface of the rotary drum 46 in the direction of the axis "B" of rotation of the drum 46.

Preferably, the drum 46 has on its outer surface at least one free region, that is, without contact members. In other words, the arrangement of the contact members along a spiral trajectory is such as to not complete a round angle along the extension of the trajectory on the outer surface of the drum 46 in the direction of the axis of rotation "B".

Preferably, this free region of the drum 46 extends in the direction of the axis of rotation "B" for a distance at least equal to the distance between a first slowing disk and a last slowing disk of the user shaft 30, that is to say, the free region is a sector of the outer surface of the drum 46 with a rectangular type plan shape and in which there are no contact members.

In other words, there is an angular position of the drum 46 in which no contact member of the drum 46 interacts with a respective slowing disk 45 present on the user shaft 30. In effect, there is an angular position of the drum 46 corresponding to a configuration of disengagement of the transmission 1 (also referred to as the idle configuration of the transmission 1).

With reference to the above-mentioned slowing disks 45, each of them has along the perimeter edge an annular element made of a material which is deformable by wear and friction, such as, for example, plastic material, having also a of the circular type cross section, for example it may be a rubber ring with a circular cross section.

Preferably, in the engaged configuration of transmission 1 the coupling with reversible connection between a second selected transmission unit 300 and the respective user shaft 30, is made using a deformation force generated between a slowing disk 45 connected to a respective second transmission unit 300 and a respective contact member.

In effect, by the interaction between the contact member and the annular element associated with it, a deformation force is generated such as to generate a transient difference in speed of rotation between the disk 45 and the respective selected gear wheel 33.

For this purpose, the deformation force must preferably be such as to overcome the elastic type disengagement force of the coupling with reversible connection.

During the coupling with reversible connection on the selected gear wheel 30 the other gear wheels 33 of the user shaft 33 rotate freely relative to it being in a non-selected configuration of the gear wheels 33.

Preferably, the transmission 1 comprises a recognition device 50 which controls the passage from a disengagement configuration of the mechanical transmission (idle configuration) of the transmission 1 to an engagement configuration of the mechanical transmission ratio of the transmission 1.

Preferably, the recognition device 50 is switchable from a state interrupting the passage from a disengagement configuration of the mechanical transmission to an engagement configuration of the mechanical configuration to a state releasing the passage from the disengagement configuration of the mechanical transmission to the engagement of the transmission 1.

Preferably, when the recognition device 50 is switched to an interrupting state it activates the disengagement configuration of the transmission 1, whilst when the recognition device 50 is switched to a releasing state it activates the engagement of the transmission 1.

Preferably, the recognition device 50 is such as to normally block the passage from the disengagement configuration of the mechanical transmission to the engagement configuration of the mechanical transmission of the transmission 1, whilst the reverse passage may also occur without the need to switch the recognition device 50 to a state suitable for that passage.

According to an embodiment, the recognition device 50 is switchable from the interrupting state to the state releasing the passage from the disengaged configuration of the transmission 1 to the engaged configuration of the transmission 1 by means of recognition of an impression of a key in a predetermined seat. Both the key and the predetermined seat are included in the recognition device 50, but are not shown in the accompanying drawings. The conversion from an engaged configuration to a disengaged configuration of the transmission system 1 may be performed by a snap-on system of a mechanical type (not illustrated).

According to different embodiment, the recognition device 50 is switchable from the interrupting state to the state releasing the passage from the disengaged configuration of the transmission 1 to the engaged configuration of the transmission 1 by means of an electronic circuit suitable for receiving/sending an identification code (such as an alphanumeric code); these systems are included in the recognition device 50, but are not shown in the accompanying drawings.

Preferably, the electronic circuit may be an electronic key of a "transponder" type in which the internal electronic circuit is equipped with a physical memory containing at least the information of the alphanumeric code.

The conversion from an engaged configuration of the transmission to a disengaged configuration of the transmission system 1 may be performed by a snap-on system of a mechanical type (not illustrated), also with the mechanical key not inserted or the "transponder" key not close to the recognition device 50, and reversible only by switching the recognition device 50.

In the disengaged configuration of the mechanical transmission of the transmission 1, with the recognition device 50 switched to an interrupting state, the drum 46 has an angular position in which no contact member of the drum 46 interacts with a respective slowing disk 45 present on the user shaft 30 to generate a sliding friction force, that is, no transmission ratio is inserted between the driving shaft 10 and the user shaft 30. In the disengaged configuration of the mechanical transmission the recognition device 50 is switched to an interrupting state.

In this state, any rotation of the pedal cranks 100 connected to the driving shaft 10 will have no effect on the user shaft 30 and on the transmission 1 in general, except for an off-load rotation of the driving shaft 10.

Therefore, according to this invention, the activation system 40 is designed for the engaging, changing and disengaging of a transmission ratio in the transmission 1 whilst the recognition device 50 at least enables the passage from the disengaged configuration of the transmission 1 to the engaged configuration of the mechanical transmission.

According to the preferred embodiment of the invention, the transmission 1 comprises a rigid supporting element 60 structured for forming at least one fixed support for at least the intermediate shaft 20. This element is shown schematically in FIG. 5.

The rigid supporting element 60 is structured in such a way as to form a fixed support with respect to which the intermediate shaft 20 can rotate freely, preferably along the relative axis of rotation "Y".

Preferably, the supporting element 60 is such as to support the intermediate shaft 20 in two points, still more preferably at the free end 22 of the intermediate shaft 20.

Preferably, the supporting element 60 is such as to also support the driving shaft 10 and the user shaft 30.

Preferably, the rigid supporting element 60 is a box containing the transmission 1, which can have a twofold function as structural support and as protection afforded to the elements contained in it.

Preferably, the supporting element 60 is shaped in at least an inner portion to present open seats designed to house at least one free end 11 of the driving shaft 10, one free end 22 of the intermediate shaft 20 and one free end 31 of the user shaft 30 with the respective first and second transmission units 200, 300 as well as any other elements comprised in the transmission 1.

Preferably, the above-mentioned open seats of the supporting element 60 are prepared for housing both the free ends of the driving shaft 10, of the intermediate shaft 20 and of the user shaft 30.

The above-mentioned open seats are shaped as housing for rolling bearings interposed between the supporting element 60 and the free ends of the rotated shafts, such as the driving shaft 10, the intermediate shaft 20 and the user shaft 30 of the transmission 1.

The above-mentioned elements which do not have a specific numerical reference are not shown in the accompanying drawings.

The supporting element 60 may have stiffening ribs externally or finished surfaces to impart to the entire transmission 1 a predetermined appearance.

Preferably, the supporting element 60 may be made of metal such as, for example, aluminium or magnesium, or a plastic polymer charged with glass or carbon fibres.

Preferably, the metallic supporting element 60 may be made by die casting or formed by mechanical processing for removal of swarf or by welding of pre-prepared semifinished metal items. If the supporting element 60 is made from non-metallic materials it may be made by means of injection moulding or by means of mechanical processing for removal of swarf.

In one embodiment of this invention, the supporting element 60 comprises two shells which couple specularly along an open edge and are joined to each other by threaded fixing means.

In a different embodiment, the supporting element 60 comprises three separate parts, two ends (with the aim of covering) and a central part having the supporting seats of the driving shaft 10, intermediate shaft 20 and user shaft 30 of the transmission 1, all joined to each other by means, for example, of threaded fixing means.

Figure 3:
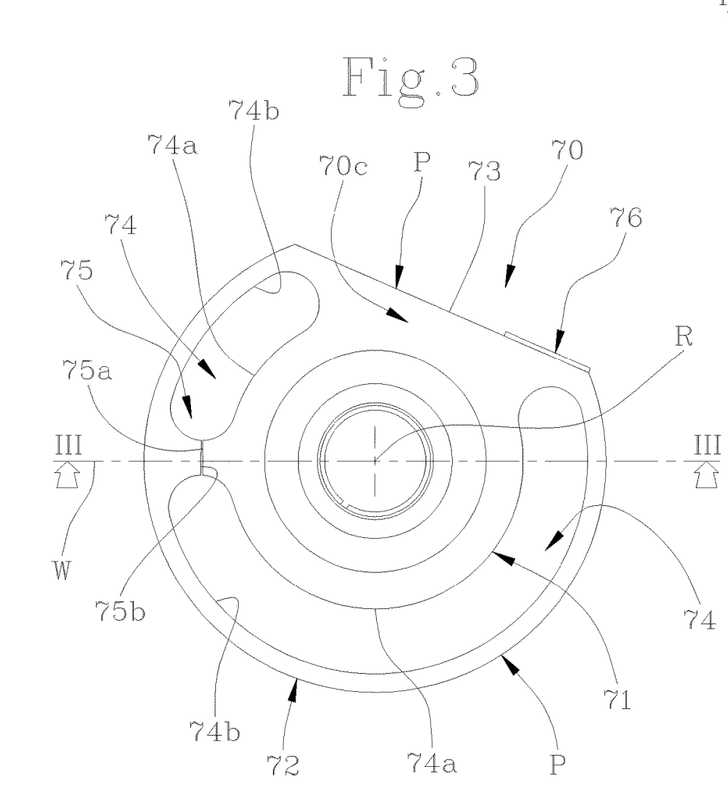
FIG. 3 is a schematic plan view of a detail of the transmission of FIG. 1.
Figure 3A:
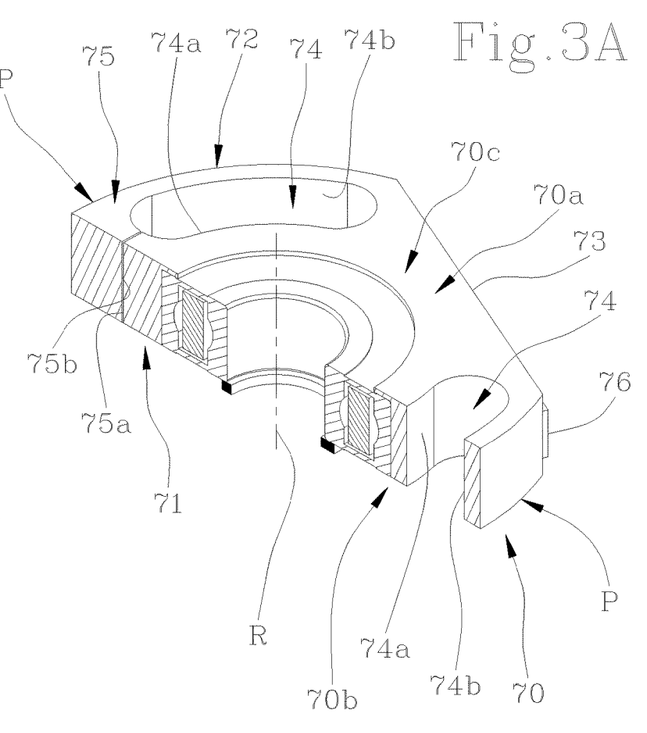
FIG. 3A is schematic cross section perspective view of FIG. 3.
Figure 4:
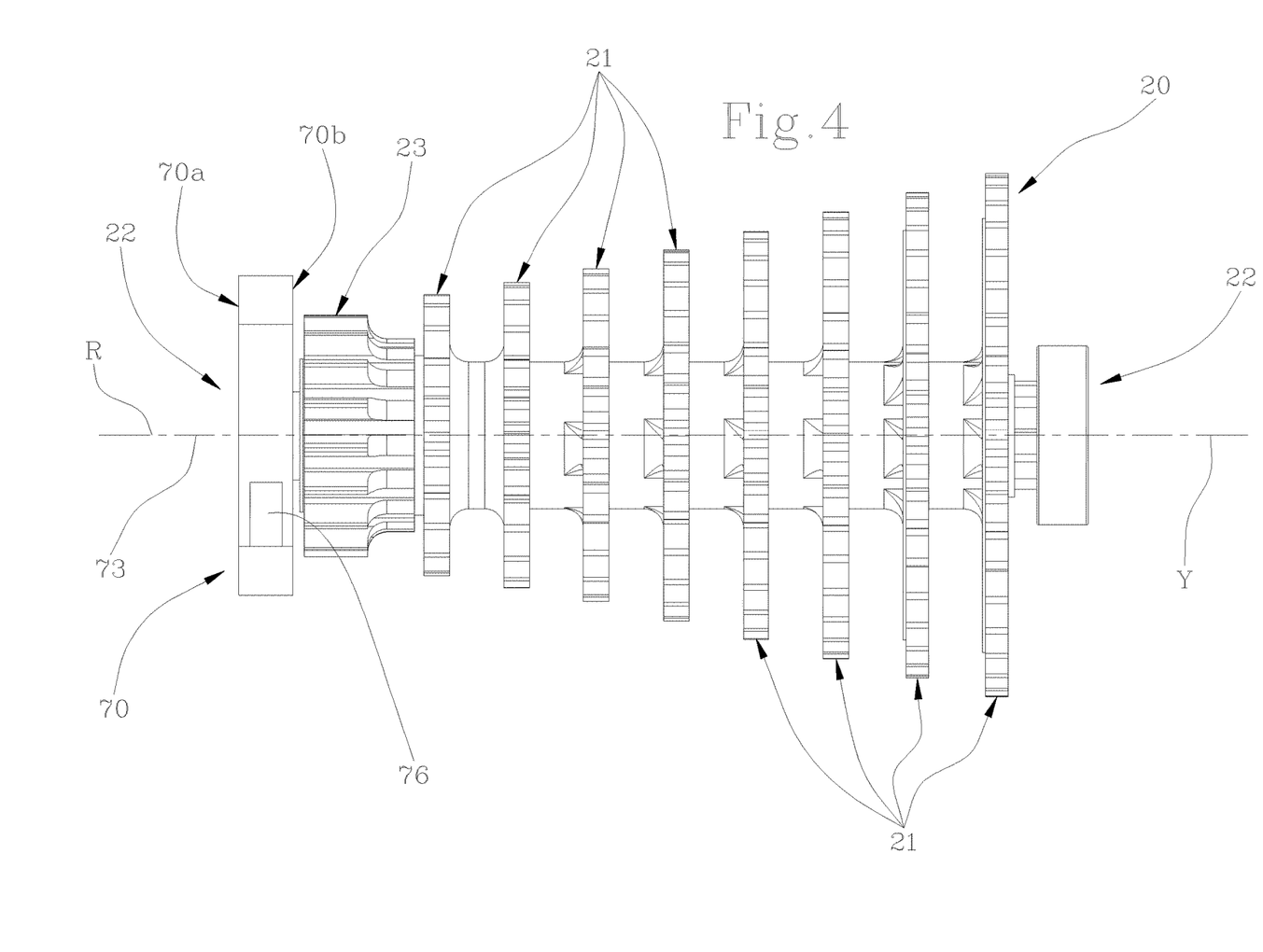
FIG. 4 is a schematic plan view of the transmission of FIG. 1 with some parts not illustrated to better illustrate others.
Figure 5:
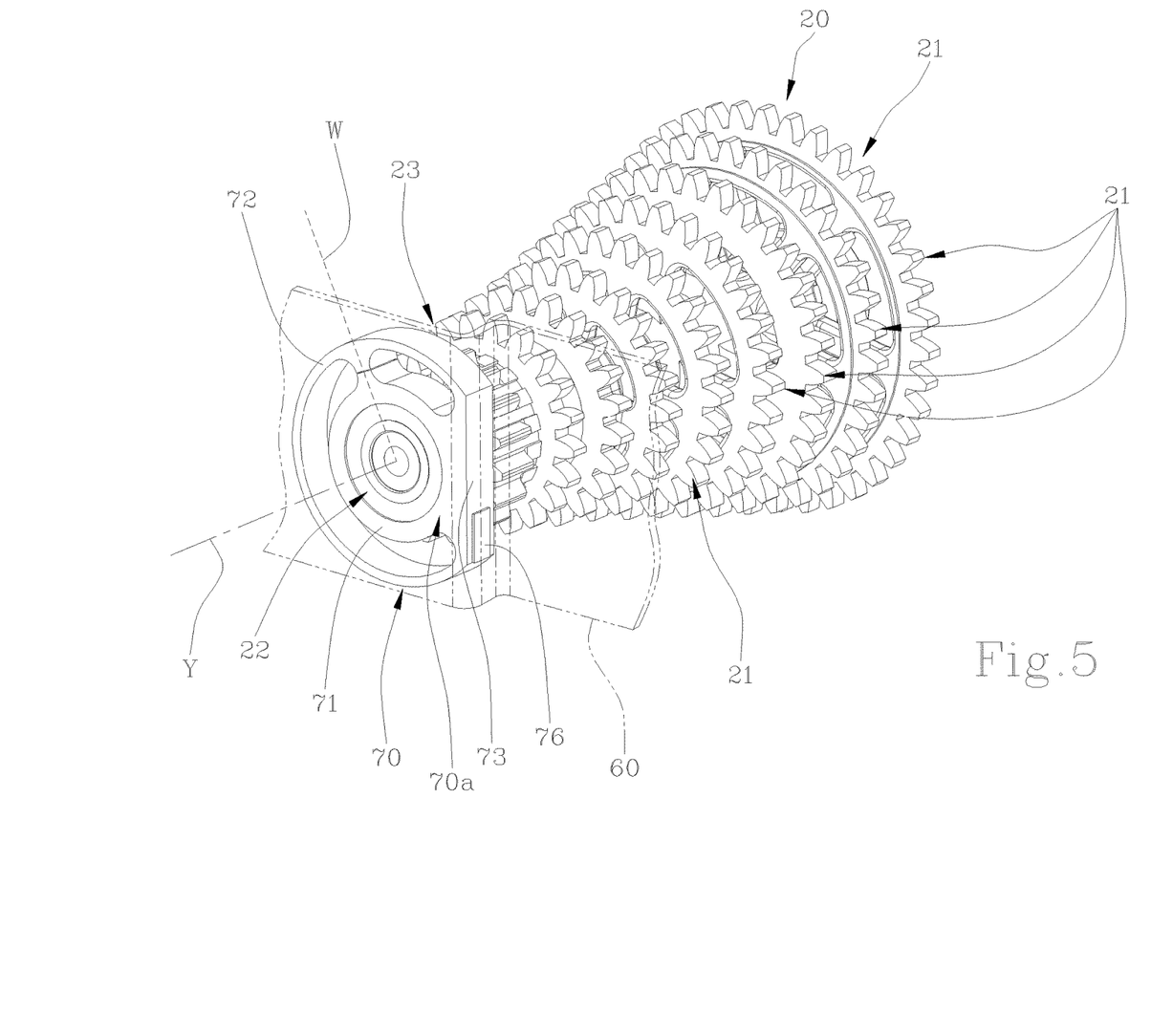
FIG. 5 is a schematic perspective view of the transmission of FIG. 4.

With reference to the accompanying drawings, especially FIGS. 3-5, the transmission 1 comprises a measuring element 70 having a first portion 71 with controlled deformation forming at least one mobile support for the intermediate shaft 20 and a second supporting portion 72 interposed between the first portion 71 and the rigid supporting element 60.

Preferably, the first portion 71 with controlled deformation of the measuring element 70 is such form a mobile support relative to which the intermediate shaft 20 can rotate.

Preferably, the first portion 71 with controlled deformation is designed to house a roller bearing or an element designed to rotatably support the intermediate shaft 20 using a free end 22 of it.

Preferably, the measuring element 70 comprises a prismatic structure, preferably cylindrical, for example of a cylindrical type, with a flat perimetric portion 73 such that it can be constrained on a respective receiving surface of the rigid supporting element 60.

In other words, the measuring element 70 has a prismatic shape with a flat perimetric portion 73 such as to form a supporting and/or connecting surface of the measuring element 70, the connection is designed to support the stresses active during an operating configuration of the transmission 1, in particular the stress acting on the intermediate shaft 20.

Preferably, the measuring element 70 has an axis of extension "R" coaxial with the axis "Y" of the intermediate shaft 20.

Preferably, the measuring element 70 has at least one slot 74 extending around the axis of extension "R", still more preferably, the slot 74 is a through slot in such a way as to put in connection the end surfaces 70a, 70b of the measuring element 70.

Preferably, the slot 74 is such as to divide into clearly separate zones the measuring element 70 in such a way as to form the first portion 71 with controlled deformation and the second supporting portion 72.

Preferably, the first portion 71 with controlled deformation is positioned at the axis of extension "R" whilst the second supporting portion 72 is positioned at the margins of the prismatic structure and defines a portion of a perimetric edge "P" of the measuring element 70.

According to the preferred embodiment of the invention, the first portion 71 with controlled deformation and the second supporting portion 72 are connected to each other by a shared portion 70c preferably positioned at the above-mentioned flat perimetric portion 73.

Preferably, the first portion 71 with controlled deformation comprises a projection 75 extending from the first portion 71 towards the second portion 72 of the measuring element 70.

The projection 75 is such as to extend inside the slot 74, that is, the projection 75 extends from a first portion of the lateral surface 74a of the slot 74 defining the first portion 71 with controlled deformation towards a second portion of the lateral surface 74b defining the second supporting portion 72 facing the slot 74 of the measuring element 70.

In accordance with the preferred embodiment of the invention, the projection 75 is defined by two portions: a first portion integral with the first portion 71 with controlled deformation and delimited by a first distal surface 75a and a second portion integral with the second supporting portion 72 and delimited by a second distal surface 75b.

In a different embodiment, not illustrated in the accompanying drawings and covered in the scope of the invention, the projection 75 is defined by a single portion integral with the first portion 71 with controlled deformation and extending towards the second supporting portion 72 of the measuring element 70.

In another and different embodiment, not illustrated in the accompanying drawings and covered in the scope of the invention, the projection 75 is defined by a single portion integral with the second supporting portion 72 and extending towards the first portion 71 with controlled deformation of the measuring element 70.

Preferably, the projection 75 extends along a direction "W" parallel to the direction of the force applied by a tooth of the gear wheel 12 of the driving shaft 10 to a tooth of the pinion 23 of the intermediate wheel 20 also called "straight line of action", during an operating configuration of the transmission 1.

In other words, the projection 75 is not normally such as to place in direct contact the first portion 71 with the second portion 72 of the measuring element 70. The projection 75 is such as to normally divide the slot 74 into two portions as shown in the accompanying drawings.

From the mechanical point of view, the measuring element 70 is subjected to the stresses active on a support of a mechanical transmission shaft, such as the intermediate shaft 20, according to this invention.

Thus, the mechanical requirements of the measuring element 70 are such as to support the stresses active on the elements of the transmission 1, in particular the force applied by the driving shaft 10 to the intermediate shaft 20, during an operating configuration of the transmission 1.

The measuring element 70 presents the first portion 71 with controlled deformation with predetermined mechanical yielding characteristics when it is stressed by the force transmitted from the driving shaft 10 to the intermediate shaft 20.

Preferably, the deformability of the measuring element 70 is a function of the geometrical features of it and/or of the type of material with which it is made, still more preferably a lightweight alloy for example aluminium. Also, the deformability of the measuring element 70 always means a deformation in the elastic field of the specific material with which the element is made.

It should be noted that the slot 74 creates a passage through the cylindrical body of the measuring element 70 making it lighter in terms of weight and also allows a predetermined stiffness of the measuring element 70 to be defined.

For this reason, in a condition wherein the measuring element 70 has its distal surfaces 75a, 75b of the projection 75 separated from each other, the measuring element 70 along the direction "W" parallel to the "straight line of action" has a predetermined stiffness value.

According to the scope of the inventive concept, the controlled deformability of the measuring element 70 is such as to allow an approach of at least one portion of one of the lateral surfaces 74a, 74b to the projection 75 when the mechanical force applied between the driving shaft 10 and the intermediate shaft 20 is such as to contrast at least partly the predetermined stiffness of the measuring element 70. In other words, the projection 75 defines a stop to avoid excessive inclination of the driving shaft (10) relative to the intermediate shaft (20).

In accordance with the preferred embodiment of this invention, the deformability of the measuring element 70 is such as to allow an approach and also, if necessary, a contact of the first distal surface 75a of the projection 75 with the second distal surface 75b of the projection 75, preferably along the direction "W" parallel to the "straight line of action".

During an operating configuration of the transmission 1, whilst between the first distal surface 75a of the projection 75b and the second distal surface 75 of the projection 75 there is a relative moving together without a direct contact, it can be inferred that the force applied by the driving shaft 10 to the intermediate shaft 20 has a value less than a predetermined threshold value and the measuring element 70 along the direction "W" parallel to the "straight line of action" has a predetermined stiffness value.

The first distal surface 75a and the second distal surface 75b of the projection 75 enter into contact with each other when the force applied by the driving shaft 10 to the intermediate shaft 20 exceeds the predetermined threshold value.

In other words, the projection 75 enters into contact with a portion of one of the lateral surfaces 74a, 74b of the slot 74 and, therefore, the mechanical force applied between the driving shaft 10 and the intermediate shaft 20 is such as to contrast completely and overcome the predetermined stiffness of the measuring element 70.

Below a predetermined threshold value the distal surfaces 75a, 75b of the projection 75 do not enter into contact; above that threshold value the distal surfaces 75a, 75b of the projection 75 enter into contact.

At the same time as the contact between the distal surfaces 75a, 75b of the projection 75, the measuring element 70 changes its overall stiffness.

Preferably, after contact has been made between the distal surfaces 75a, 75b of the projection 75, the measuring element 70 has a stiffness greater than the above-mentioned predetermined stiffness along the direction "W" parallel to the "straight line of action".

In effect, in the configuration of contact between the distal surfaces 75a, 75b of the projection 75 there is a change in the geometry of the measuring element 70 relative to which a flow of internal forces redistributes in such a way that the measuring element has a resistance to the external stresses (and therefore has a stiffness) much greater than a configuration of non-contact between the distal surfaces 75a, 75b of the projection.

In other words, the contact between the distal surfaces 75a, 75b of the projection "closes" the annular geometry of the second supporting portion 72 with the first portion 71 in a further point relative to the shared portion 70c giving the structure a greater stiffness, in particular along the direction "W".

Advantageously, the measuring element 70 of the transmission 1 comprises a strain gauge 76, preferably electrical, which is able to transduce a yield (in terms of elastic deformation) of the first portion 71 with controlled deformation into an electrical signal the value or which corresponds to a torque value applied between the driving shaft 10 and the intermediate shaft 20 and directed along the direction "W" parallel to the "straight line of action", during an operating configuration of the transmission 1. The strain gauge 76 can be seen in FIGS. 3, 3A, 4 and 5.

Preferably, the electrical strain gauge 76 is applied on the flat perimetric portion 73 of the measuring element 70 at the shared portion 70c and interposed between the perimeter portion and a respective receiving surface of the rigid supporting element 60 (schematically illustrated in the perspective view of FIG. 5).

According to a different embodiment, not illustrated and fully covered in the inventive concept of this invention, the electrical strain gauge 76 is positioned in another point, preferably an interface zone between the measuring element 70 and a receiving surface of the rigid supporting element 60, or even in a shared zone between the first deformable portion 71 and second supporting portion 72.

At each predetermined position of the electrical strain gauge 76 a calibration is carried out of the signal emitted by the gauge to create a correct calibration curve of the "Force-Deformation" type.

Advantageously, in the configuration of the measuring element 70 which has the relative distal surfaces 75a, 75b of the projection 75 in contact with each other, the stiffness of the measuring element 70 is such as to allow the correct rotation between the driving shaft 10 and the intermediate shaft 20 preventing during an operating configuration of the transmission 1 that the intermediate shaft 20 (subject to the yield by the measuring element 70 since it is the end support of the intermediate shaft 20) has the relative axis of rotation "Y" lying skew relative to the axis of rotation "X" of the driving shaft 10.

A skew position of the axis of rotation of the intermediate shaft 20 would compromise the meshing of the pinion 23 with the gear wheel 12 of the driving shaft 10 creating problems of wear as well as reducing the efficiency of the mechanical transmission.

The above-mentioned activation system 40 is designed to receive and interpret the electrical signal produced by the electrical strain gauge 76, in particular during the configuration of contact between the distal surfaces 75a, 75b of the projection 75 of the measuring element 70.

More specifically, the control unit of the activation system 40 is designed to receive and interpret the electrical signal produced by the electrical strain gauge 76.

In general, the transmission may comprise any control system operatively connected to the measuring element 70 and designed to receive and interpret the electrical signal produced by the electrical strain gauge 76.

Advantageously, the activation system 40 of the transmission 1 is such (more specifically, the control unit of the activation system 40 is configured to perform the operation defined here) as to interpret the electrical signal produced by the electrical strain gauge 76 for switching the transmission ratio acting between the driving shaft 10 and the user shaft 30 into a different transmission ratio.

Preferably, the activation system 40 of the transmission 1 (more specifically, the control unit of the activation system 40 is configured to perform the operation defined here) switches the transmission ratio acting between the driving shaft 10 and the user shaft 30 during the configuration of contact between the distal surfaces 75a, 75b of the projection 75 of the measuring element 70.

The activation system 40 (more specifically, the control unit of the activation system 40 is configured to perform the operation defined here), after interpreting the electrical signal produced by the electrical strain gauge 76, produces an output signal (for example of the electrical type) such as to rotate, using the movement portion 46a, the drum 46 to change the transmission ratio acting on the transmission 1.

According to a preferred embodiment, the activation system 40 (more specifically, the control unit of the activation system 40 is configured to perform the operation defined here) is designed to modify the angular position of the drum 46 by means of an action on the movement element 46a which, preferably, also comprises a gear wheel for meshing with another gear wheel, for example, connected to the shaft of a brushless type electric motor designed for moving and positioning the drum 46 (see FIGS. 1 and 2) in order to switch the transmission ratio acting between the driving shaft (10) and the user shaft (30) into a different transmission ratio.

According to a different embodiment, the activation system 40 (more specifically, the control unit of the activation system 40 is configured to perform the operation defined here) receives as input signal the electrical signal of the electrical strain gauge 76 for interacting with the mechanical means (for example with the movement of a cam or a level) so as to mechanically switch the transmission ratio acting between the driving shaft 10 and the user shaft 30 into a different transmission ratio.

In this embodiment, for example, the movement element 46a is controlled by a flexible linkage of a metallic wire type with a sheath (preferably of the type with a double wire, that is to say, a system of the "push-pull" type) fixed on the handlebars of the bicycle and connected directly to the movement element 46a of the drum 46. The system may comprise one or more levers on the handlebars with a snap-on locking system for setting up and fixing the stroke of the metallic wire connected to the drum 46 and, therefore, the angular position of the drum 46. This solution is not shown in the accompanying drawings.

Advantageously, the transmission comprising the measuring element 70 according to this invention makes it possible to measure the torque applied on the driving shaft 10 measuring the radial thrust away of the intermediate shaft 20 relative to the driving shaft 10 with which the intermediate shaft 20 is meshed. In other words, during the rotation of the intermediate shaft 20 meshed with the driving shaft 10, the intermediate shaft 20 tends to move away from the latter as a function of the torque which is applied on the driving shaft 10 (for example by a pair of pedal cranks). The measuring element 70 measures the moving away force of the intermediate shaft 20 relative to the driving shaft 10 and derives, by means of a processing carried out by a suitable control system, the measurement of the torque on the driving shaft proportional to the moving away force.

Consequently, it is no longer necessary to use complicated torque sensors as described above with regard to the prior art.

The preferred embodiment of the invention comprises a bicycle comprising the transmission 1 described above.

Preferably, this invention relates to an electric bike comprising the transmission 1 described above, in turn comprising an electrically powered activation system 40, which is structured with electrically powered elements and a detection system 70 designed interface with the activation system 40.

The electric bicycle according to this invention also comprises a rechargeable electric battery and a brushless type motor 80 for supplying and serving the transmission 1 during use of the bicycle. This solution is partly illustrated in FIG. 6.

According to a different embodiment and fully covered in the inventive concept of the invention, the electric bicycle comprises a rechargeable electric battery and a brushless type motor connected by a mechanical transmission with a fixed ratio to the drive wheel of the bicycle. This solution is not illustrated in the accompanying drawings.

According to another and different embodiment fully covered in the inventive concept of the invention, the transmission 1 is not powered electrically and does not comprise elements powered electrically, and is associated with a bicycle of the non-electric type, that is to say, of the mechanical type.

With reference again to the preferred embodiment of the invention, the electric bicycle comprises a transmission 1 equipped with a control system designed to activate/deactivate and vice versa the brushless type electric motor 80 (or regulate the power of the latter) in such a way as to control the value of the drive torque applied by the driving shaft 10 to the user shaft 30 during a use configuration of the electric bicycle.

It should be noted that the control system may or may not be integrated in the activation system 40 described above.

Preferably, the brushless electric motor 80 is active on a first transmission unit 200 of the intermediate shaft 20 using a drive gear having a fixed transmission ratio.

Advantageously, the electric bicycle according to this invention has the activation system 40 designed for processing a control algorithm such as to: switch the transmission ratio in the event of the configuration of the measuring element 70 with the distal surfaces 75a, 75b of the projection 75 in contact with each other.

Moreover, the control system is designed to activate/deactivate and vice versa the brushless type electric motor 80 (or regulate the power of the latter) in such a way as to keep constant the value of the drive torque applied by a user to the pedal cranks 100 of the bicycle.

If the control system is integrated in the activation system 40, the activation system 40 has control authority both on the power of the electric motor 80 and on the change of ratio of the transmission 1, in order to control the level of drive torque to the input 11 of the transmission 1.

Preferably, in order to prevent the occurrence of peaks of torque generated by the brushless electric motor 80 also on the driving shaft 10 and thus on the pedal cranks 100 of the bicycle, the transmission 1 comprises a snap-on free transmission element acting between the brushless electric motor 80 and the driving shaft 10.

In order to better describe the method of angular positioning of the drum 46, the latter comprises a cylindrical portion, preferably positioned at one end of the drum 46, which is equipped along the perimetric edge with a plurality of hollows 46d numerically equal to the number of transmission ratios which can be inserted plus one, for the engagement position of the transmission 1.

Preferably, the hollows 46d of the drum 46 are designed to interact with a position sensor, for example an electronic micro-switch.

Preferably, the information processed by the microswitch is sent to the positioning system 40 by electric wiring providing a status on the type of transmission ratio active in the transmission 1.

As already described, the passage from an engaged transmission configuration to a disengaged transmission configuration of the transmission 1 is controlled by the recognition device 50.

Preferably, the recognition device 50 is directly connected (mechanically and/or electronically) to the movement element 46a of the drum 46 to allow its positioning, in particular between a disengaged mechanical transmission position (interrupting state of the recognition device 50) and an engaged mechanical transmission position (releasing state of the device recognition 50).

Advantageously, the electric bicycle according to this invention is equipped with a control system such as to maximise the energy saving (charging state of the electrical battery) with respect to a satisfactory use of the bicycle by a user (torque applied on the pedal cranks of the bicycle). Moreover, the user of the bicycle according to this invention need not worry about changing the transmission ratio each time it is necessary (for example, when travelling uphill/downhill).

Advantageously, the electric bicycle equipped with a torque sensor active on the intermediate shaft of the transmission has greater degree of compactness and constructional simplicity of the transmission.

Advantageously, a torque sensor according to this invention is simple to construct, allows an easy installation and calibration and does not require modifications to the mechanical parts of the transmission and/or the making of special mechanical parts as in the prior art.

The torque sensor according to this invention is such as to have size and dimensions similar to a traditional ball bearing, so it may be advantageously installed also on bicycle transmissions which have not been developed with that technology.

Advantageously, the control system of the bicycle according to this invention has a logic such that the user can ride the bicycle with a constant force, regardless of the type of route followed, thanks to the adjustment (automatic) of the work performed by the electric motor and the transmission ratio inserted.

In this way, the user can select, during use of the bicycle, the level of force according to the user's preferences and no longer the degree of assistance of the electric motor as in the prior art.

Advantageously, the transmission of the electric bicycle according to this invention can also autonomously control the change of the transmission ratio, in such a way as to free the user from each type of task with regard to the control of the bicycle and the system on board, enabling the user to focus solely on the physical activities.

The invention claimed is:

1. A transmission (1) for means of transport comprising:
a driving shaft (10) suitable for being positioned on the axis ("X") of a driving force (100);
an intermediate shaft (20) comprising at least one first transmission unit (200), the first transmission unit (200) being driven to rotate by a gearwheel (12) fixed on the driving shaft (10);
a rigid supporting element (60) structured for forming at least one fixed support for at least the intermediate shaft (20), wherein the intermediate shaft (20) can rotate relative to the fixed support;
a measuring element (70) comprising a first portion (71) with controlled deformation forming at least one mobile support for the intermediate shaft (20), wherein the intermediate shaft (20) can rotate relative to the mobile support; and a second supporting portion (72) interposed between the first portion (71) and the rigid supporting element (60); the first portion (71) with controlled deformation and the supporting second portion (72) being connected to each other by a shared portion (70c);
the measuring element (70) comprising a strain gauge (76) able to convert a movement between the first portion (71) with controlled deformation and the second supporting portion (72) into a value of the mechanical force; the electrical strain gauge (76) being applied on the shared portion (70c);
wherein the measuring element (70) comprises an axis of extension ("R") coinciding with an axis of rotation ("Y") of the intermediate shaft (20), the measuring element (70) comprising at least one slot (74) extending around the axis of extension ("R"), said at least one slot (74) being a through slot, thereby putting in connection end surfaces (70a, 70b) of the measuring element (70) and defining the first portion (71) with controlled deformation and the second supporting portion (72).

2. The transmission (1) according to claim 1, wherein the measuring element (70) comprises a prismatic structure, preferably cylindrical, with a flat perimetric portion (73) such that it can be constrained on a respective receiving surface of the rigid supporting element (60).

3. The transmission (1) according to claim 1, wherein the first portion (71) with controlled deformation is positioned at the axis of extension ("R") and the second supporting portion (72) is positioned at the margins of the prismatic structure and defines a portion of a perimetric edge ("P") of the measuring element (70).

4. The transmission (1) according to claim 1, wherein the first portion (71) with controlled deformation and the second supporting portion (72) are connected to each other by a shared portion (70c) preferably positioned close to the flat perimetric portion (73).

5. The transmission (1) according to claim 4, wherein at least the first portion (71) with controlled deformation comprises a projection (75) extending from the first portion (71) to the second portion (72) along a line ("W") parallel with the line of the force applied by the gearwheel (12) of the driving shaft (10) to a sprocket (23) of the intermediate shaft (20).

6. The transmission (1) according to claim 5, wherein the projection (75) is formed by two portions, one fixed to the first portion (71) with controlled deformation and delimited by a first distal surface (75a) and a second portion fixed to the second supporting portion (72) and delimited by a second distal surface (75b).

7. The transmission (1) according to claim 6, wherein the first distal surface (75a) of the projection (75) is designed to make contact with the second distal surface (75b) of the projection (75) when the mechanical force is such that it overcomes a predetermined stiffness of the first portion (71) with controlled deformation.

8. The transmission (1) according to claim 6, wherein the first distal surface (75a) of the projection (75) and the second distal surface (75b) of the projection (75) are designed to make contact in such a way that, during an operating configuration of the transmission (1), they prevent the intermediate shaft (20) from having its axis of rotation ("Y") oblique relative to the axis of rotation ("X") of the driving shaft (10).

9. The transmission (1) according to claim 1, characterised in that the strain gauge (76) is designed to generate an electrical signal depending on the movement perceived between the first portion (71) and the second portion (72); the transmission comprising a management system operatively connected to the measuring element (70) and designed to receive the electrical signal and to process it in such a way as to obtain the measurement of the torque applied on the driving shaft (10).

10. The transmission (1) according to claim 1, wherein the rigid supporting element (60) is a box of the transmission (1) having a structural function of the transmission (1) and comprising open seats designed for housing at least one free end (11, 22, 31) respectively of the driving shaft (10), of the intermediate shaft (20) and of a user shaft (30).

11. The transmission (1) according to claim 1, wherein the strain gauge (76) lies substantially at a plane tangential between the first transmission unit (200) of the intermediate shaft (20) and the gear wheel (12) of the driving shaft (10); the shared portion (70c) being at least partly located at the tangential plane.

12. A bicycle comprising the transmission (1) for bicycles according to claim 1.

13. A pedal assist bicycle comprising:
a rechargeable electric battery;
the transmission (1) according to claim 1;
an electric assist motor (80) operatively associated with the driving shaft (10) or with the intermediate shaft (20);
a control system operatively connected between the measuring element (70) for measuring a torque value and the electric motor (80);
the control system being designed to manage the torque supplied by the electric motor (80) depending on the torque value detected by the measuring element (70).

* * * * *